F. L. CROSS.
REGULATOR FOR GAS GENERATING AND SUPPLY SYSTEMS.
APPLICATION FILED JULY 6, 1909.
974,555.
Patented Nov. 1, 1910.
2 SHEETS—SHEET 1.
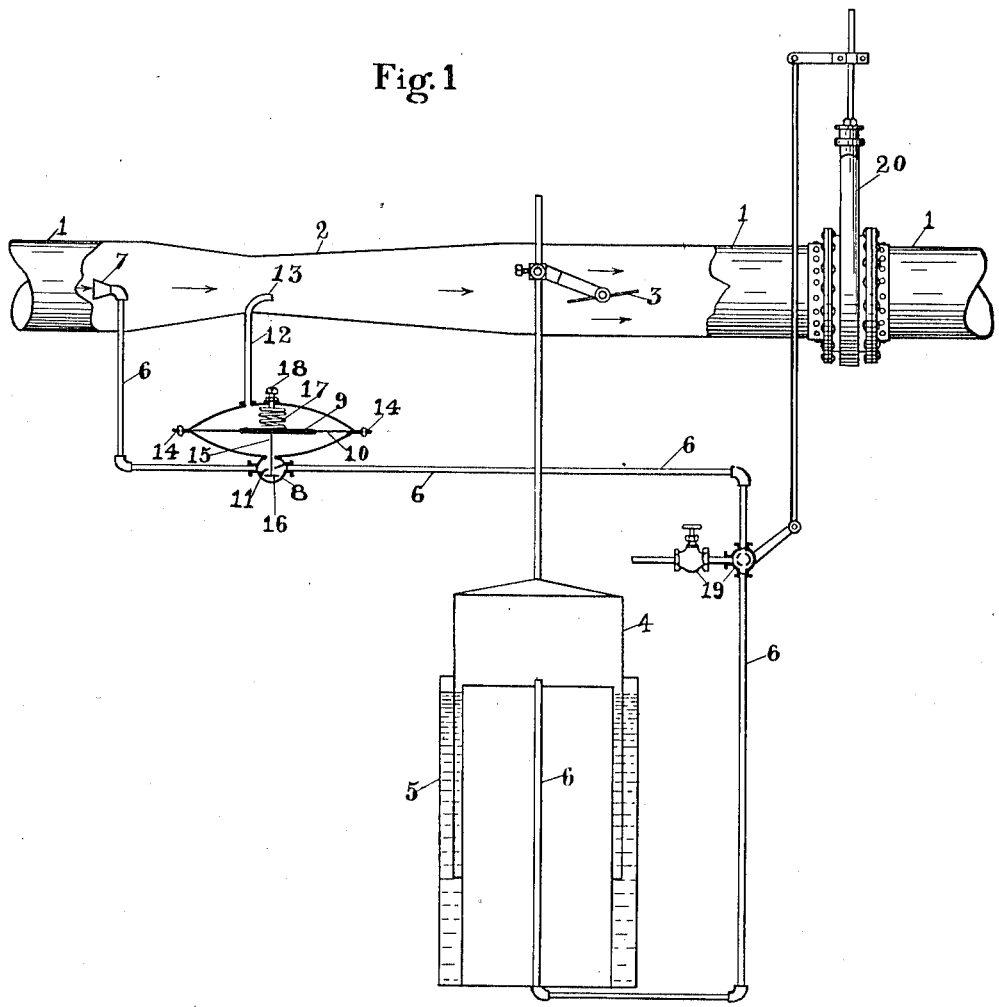
Fig. 1
Witnesses
A. M. Dorr
A. M. Shannon
Inventor
FRANK L. CROSS
By
Attorneys

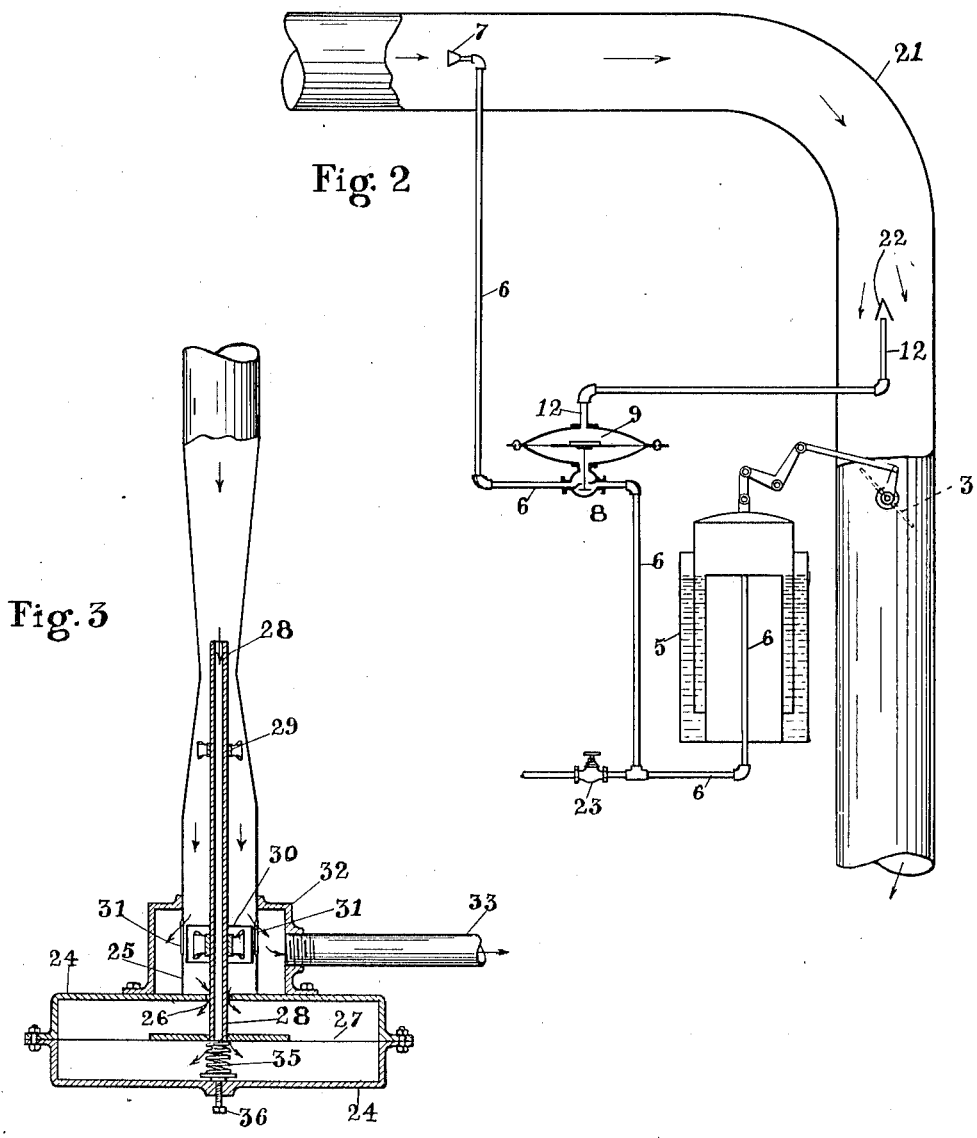

UNITED STATES PATENT OFFICE.

FRANK L. CROSS, OF DETROIT, MICHIGAN.

REGULATOR FOR GAS GENERATING AND SUPPLY SYSTEMS.

974,555.  Specification of Letters Patent.  Patented Nov. 1, 1910.

Application filed July 6, 1909. Serial No. 506,147.

*To all whom it may concern:*

Be it known that I, FRANK L. CROSS, a citizen of the United States of America, residing at Detroit, in the county of Wayne and State of Michigan, have invented certain new and useful Improvements in Regulators for Gas Generating and Supply Systems, of which the following is a specification, reference being had therein to the accompanying drawings.

This invention relates to means for automatically regulating the flow of gas or air through a conduit so that a constant volume is delivered therefrom, the device being especially adapted for use in the air supply or pressure main of a water gas plant, and in like places where it is desirable to control a comparatively large, slowly moving air or gas current.

The invention consists in the matters hereinafter set forth, and more particularly pointed out in the appended claims.

Referring to the drawings, Figure 1 is a view indicating a regulator embodying features of the invention. Fig. 2 is a view of a different arrangement of the regulator. Fig. 3 is a view of the regulator as applied to the main leading an air supply to a retort bench.

As shown in the preferred form, 1 indicates a main or conduit having a constricted portion or Venturi tube 2 inserted therein. A valve 3 in the main beyond the Venturi tube is controlled by the float 4 of a pressure tank 5 similar to a gasometer so as to be opened by its rise and closed by its fall. A pipe 6 opening into this float tank has a funnel shaped inlet or mouth 7 turned against the incoming air in the main 1 in front of the Venturi tube. A valve 8 in the pipe 6, has a chamber 9 in communication therewith, which is divided by a movable diaphragm 10 into a lower compartment opening into the valve casing between its intake and valve seat 11 and an upper compartment which is connected by a pipe 12 whose upper end 13 lies in the Venturi tube and is bent or turned away from the current to or beyond the constriction. The diaphragm, which is herein shown as flexible and clamped at its margins between the flanges 14 of the two parts of the casing forming the chamber, is connected by a stem 15 to a closure 16 in the valve which approaches the seat 11 when the diaphragm rises and recedes therefrom as the diaphragm falls. A spring 17 between the diaphragm and upper part of the casing, regulated by a thumb-screw 18, affords adjusting means for varying the range of the action. Between the controlling valve 8 and the gasometer 5, is a relief cock 19 opening into the air. In the preferred form of construction, the relief cock is three way and is operatively connected to a gate 20 of the main so as to be shut off when the latter is closed. Otherwise it is always open.

In operation, the situation of the oppositely disposed openings or intakes of the pipes from the opposite sides of the diaphragms causes a difference in the pressures on the opposite sides of the diaphragm. After adjustment to allow a certain predetermined amount to flow through the main, any fluctuations therefrom change the relative pressures initially established on opposite sides of the diaphragm and cause the diaphragm to move one way or the other. If the diaphragm rises it shuts off the controlling valve and thereby reduces the pressure in the float, allowing the latter to settle and thereby turn the valve in the main partly across the latter. The resultant decrease in velocity through the Venturi tube decreases the drop in pressure between the mouth and throat of the venturi. As a consequence the spring depresses the diaphragm, if the decrease in velocity is below that for which the apparatus is set, the controlling valve is opened, and the float correspondingly raised until the consequent opening of the valve in the main has restored the velocity of the flow through the conduit to normal.

It is found in practice that the Venturi tube effect is produced frequently in gas plants and distributing systems at different places either by reductions in the main or by turns or elbows therein, and this may be taken advantage of instead of inserting a Venturi tube in the main. Such an arrangement is shown in Fig. 2 wherein an elbow 21 or turn in the main replaces the Venturi tube. In such construction, the controlling valve 8, diaphragm chamber 9, gasometer or float tank 5, and main valve 3 are the same as previously described, and the pipe 6 has its inlet or mouth 7 in the main head of the elbow 21 and turned toward the air current. The pipe 12 from the upper compartment of the diaphragm chamber enters the main beyond the elbow, and has a conical cap or hood 22 in its end which is turned against the current. Inasmuch as the main shut-off is not adjacent the regulator, an ordinary relief cock 23 is placed in the pipe 6 near the pressure tank.

The arrangement shown has the same effect, any fluctuations in the current moving the diaphragm through the unbalancing of the pressure thereon and thus opening or shutting the main valve. Obviously, any section of the main may be utilized which produces the Venturi tube effect.

In Fig. 3 a modification of the Venturi tube construction is shown. A diaphragm casing 24 is secured to and preferably in axial alinement with the discharge end 25 of a Venturi tube, and the compartment adjacent the tube communicates therewith through an aperture 26. A diaphragm 27 in the casing has a hollow or tubular valve stem 28 extending loosely through the aperture 26 beyond the construction of the Venturi tube and reciprocating in a guide 29 in the tube. The stem carries an annular valve closure 30 sliding past ports 31 in the tube periphery which open into a bonnet 32 from which an outlet pipe 33 extends. A spring 35 with tension regulating screw 36 is used as in other constructions to vary the range of action of the apparatus.

While the apparatus as described is especially adapted for a gas system, it may be used wherever it is necessary to obtain a delivery of a constant volume of gas or air.

Changes may be made in the details of construction without departing from the spirit of the invention and I do not limit myself to any particular form or arrangement of parts.

What I claim as my invention is:—

1. A regulator for controlling flow of gas through a conduit comprising means for closing the conduit adapted to be operated by gas under pressure, means for admitting gas from the conduit to the closing means, means for controlling the admitting means, adapted to be operated by gas under pressure, and means for introducing gas thereto from the conduit under pressures that are functions of the velocity of flow of gas through the main and also when the static pressure in the conduit falls below a predetermined point.

2. A regulator for controlling flow of gas through a conduit comprising a valve for closing the conduit, means for closing the valve adapted to be operated by gas under pressure, means for admitting gas from the conduit to the valve closing means, means for controlling the admitting means adapted to be operated by gas under pressure, and means for introducing gas to the controlling means from the conduit itself under pressures that are functions of the velocity of flow of gas through the conduit.

3. A regulator for controlling flow of gas through a conduit comprising means for closing the conduit adapted to be operated by gas under pressure, means for admitting gas from the conduit to the closing means, consisting of a pipe whose inlet mouth lies in the conduit directed toward the incoming gas and whose outlet is connected to the conduit valve closing means, a valve in the pipe, a chamber, a movable diaphragm adapted to open and close the valve dividing the chamber into two compartments one of which is connected with the pipe, a pipe from the other compartment having an open end in the conduit directed away from the incoming gas, and means adapted to impose a constant resistance to the valve closing movement of the diaphragm.

4. A regulator for controlling flow of gas under pressure through a conduit comprising a valve in the conduit, a pressure float tank adapted to operate the valve by its rise and fall, a pipe connecting the conduit with the tank, a valve in the pipe, a chamber on the pipe valve, a movable diaphragm dividing the chamber into two compartments one of which is in communication with the valve pipe in front of the valve, a pipe connecting the other compartment with the conduit, the inlet mouths of the said pipes being so disposed in the conduit that the pressures exerted in the diaphragms are functions of the velocity of flow in the conduit, said diaphragms being operatively connected to the pipe valve, and adjustable means adapted to impose a predetermined constant resistance to the closing movement of the diaphragm.

5. A regulator for controlling flow of gas through a conduit comprising means for closing the conduit, a pressure float tank adapted to operate the valve, a pipe whose inlet mouth lies in the conduit directed against the current of gas in the conduit and whose outlet enters the float tank, a valve in the pipe having a chamber divided by a movable diaphragm operating the valve, into two compartments into one of which said pipe opens, a pipe from the other compartment whose inlet mouth lies in the conduit directed away from the current therein, whereby the pressures on the diaphragm sides are functions of the velocity of flow of gas in the conduit, and an adjustably tensioned spring in the chamber adapted to impose a constant resistance to the closing movement of the diaphragm.

6. In apparatus of the class described, the combination of the gas-generating apparatus; means for supplying air; a duct connecting the latter and said generating apparatus; and means for automatically increasing or decreasing the resistance to the flow of air through said duct as the resistance of the flow of air through said apparatus decreases or increases.

7. In apparatus of the class described, the combination of the gas-generating apparatus; means for supplying air; a duct connecting the latter and said generating apparatus; and means for automatically varying the resistance to the flow of air through said duct; said means being controlled by the variation of resistance to air-flow through said generating apparatus.

8. In apparatus of the class described, the combination of the gas-generating apparatus; means for supplying air; a duct connecting the latter and said generating apparatus; means in said duct for varying the resistance to the flow of air therethrough; and means for actuating said varying means and controlled by the variation of resistance to air-flow through said generating apparatus.

9. In apparatus of the class described, the combination of the gas-generating apparatus; means for supplying air; a duct connecting the latter and said generating apparatus; a movable resistance plate in said duct, whereby an opening of variable area is formed therein, in the path of travel of the air; and means for actuating said resistance plate controlled by the resistance to the air-flow through said generating apparatus.

10. In apparatus of the class described, the combination of the gas-generating apparatus; means for supplying air; a duct connecting the latter and said generating apparatus and means for automatically maintaining a flow of a constant volume of air per unit of time past a given point in said duct.

11. In apparatus of the class described, the combination of a gas producer; means for supplying air to the latter; and means in connection with said air-supplying means for automatically and continuously maintaining a flow of a constant volume of air per unit of time past a given point in said producer, independently of the area of opening of the latter.

In testimony whereof I affix my signature in presence of two witnesses.

FRANK L. CROSS.

Witnesses:
  A. M. DORR,
  G. E. McGRANN.